UNITED STATES PATENT OFFICE.

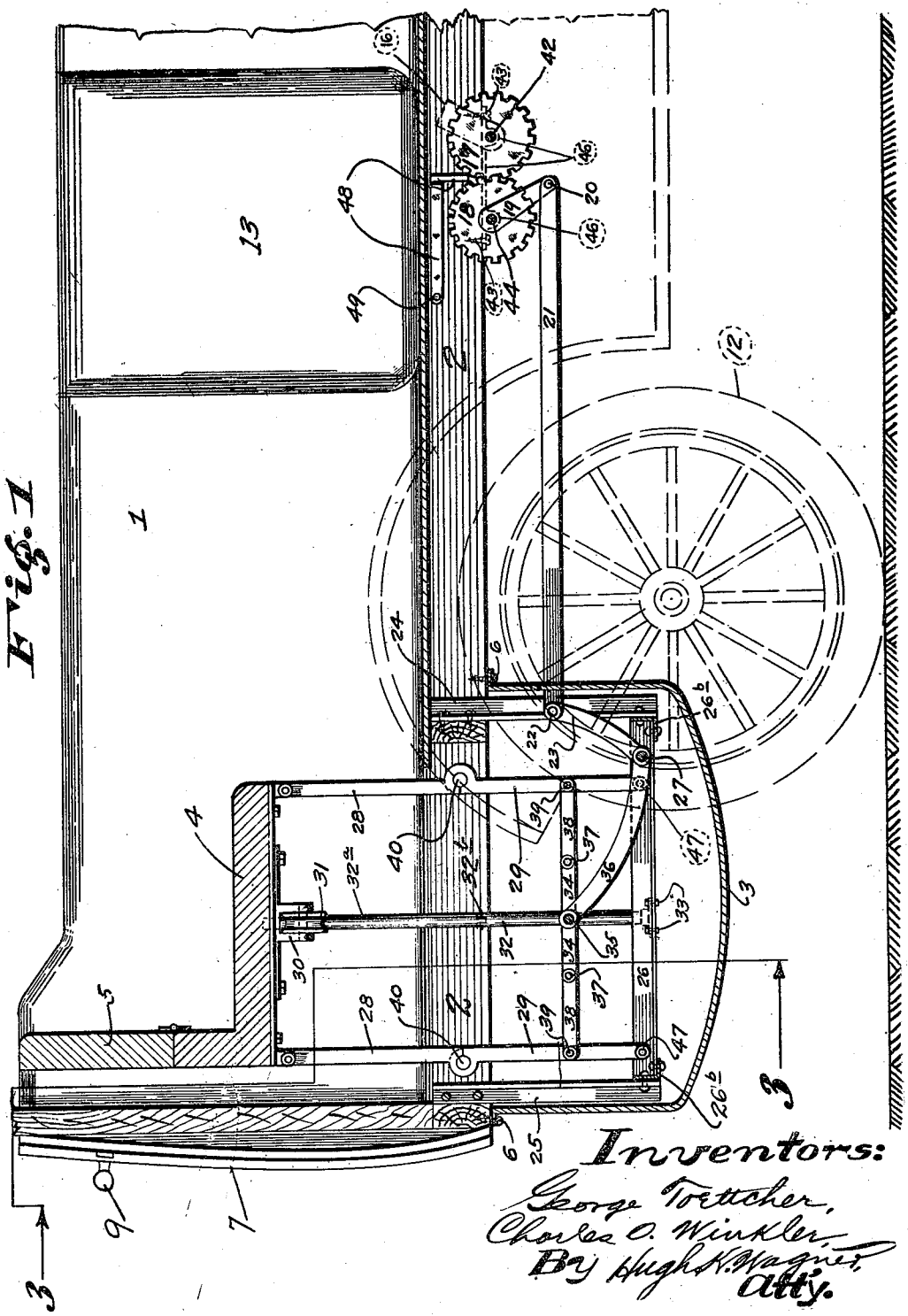

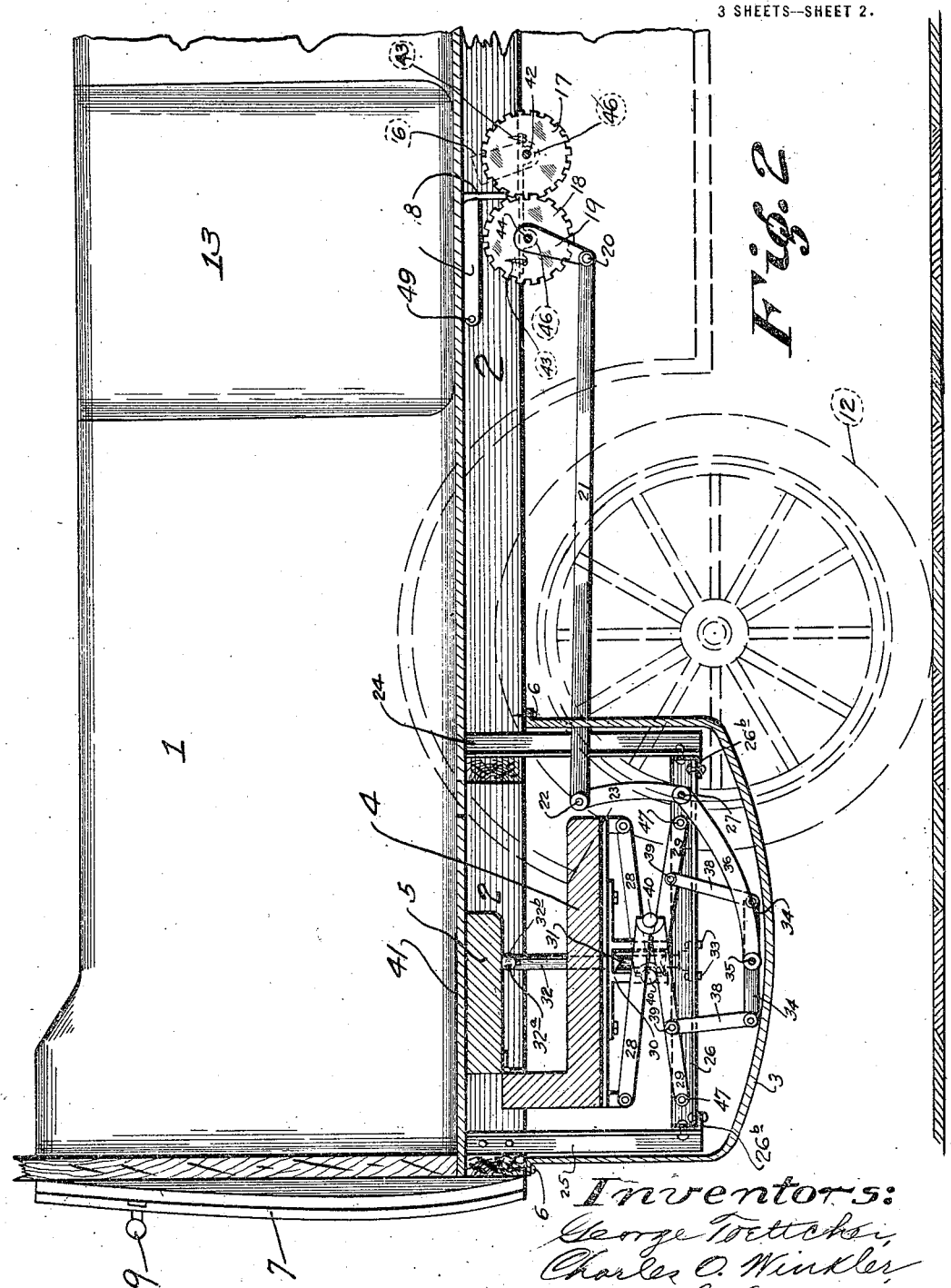

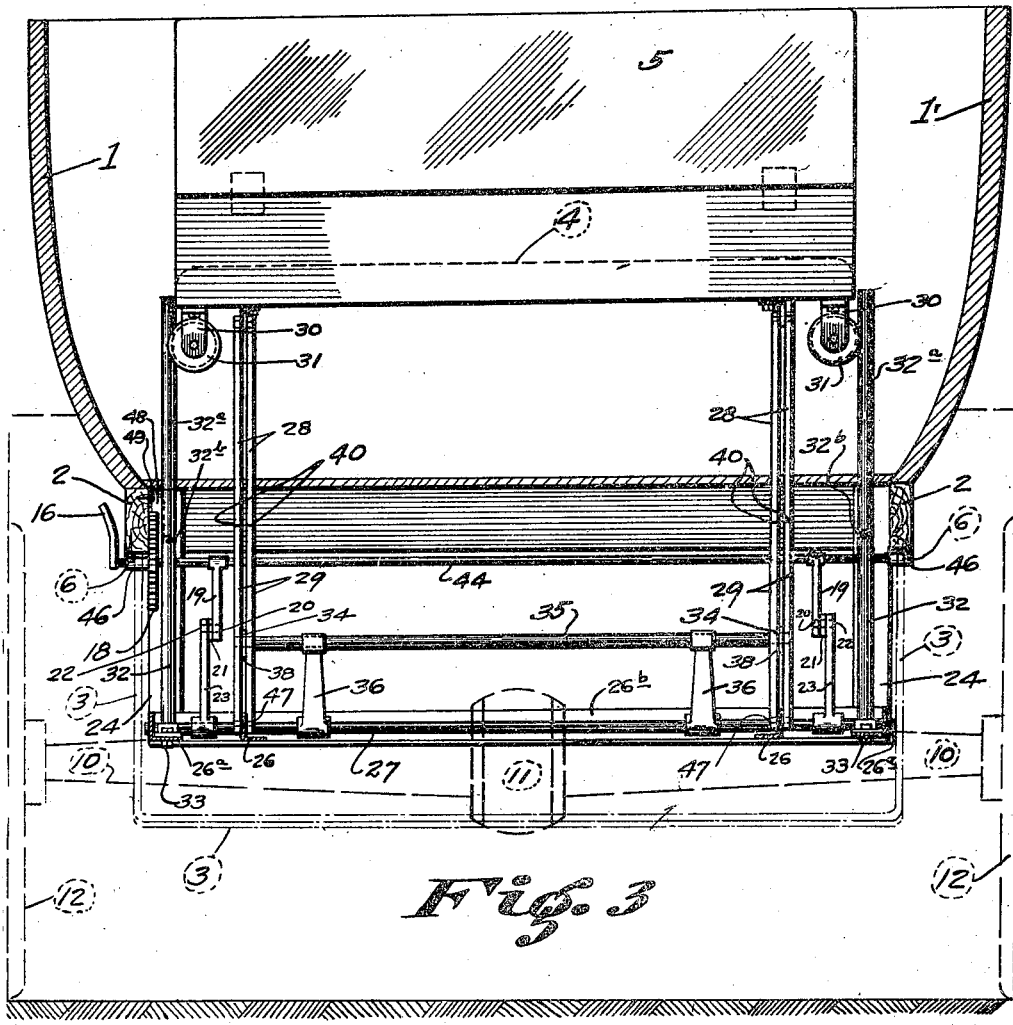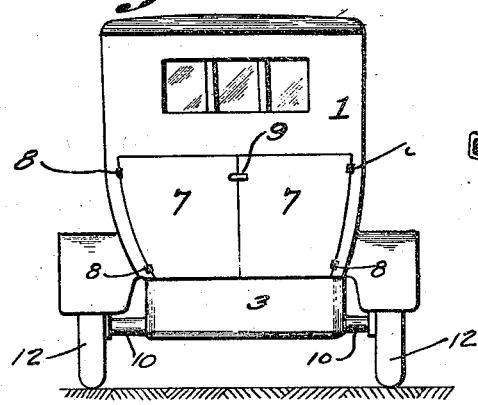

GEORGE TOETTCHER AND CHARLES O. WINKLER, OF ST. LOUIS, MISSOURI.

MOTOR-VEHICLE-CONVERTING APPARATUS.

1,296,340.  Specification of Letters Patent.  Patented Mar. 4, 1919.

Application filed April 17, 1918. Serial No. 229,153.

*To all whom it may concern:*

Be it known that we, GEORGE TOETTCHER and CHARLES O. WINKLER, citizens of the United States, residing in the city of St. Louis and State of Missouri, have invented certain new and useful Improvements in Motor-Vehicle-Converting Apparatus, of which the following is a specification.

The object of this invention is to provide simple, inexpensive, and convenient means for converting a pleasure motor vehicle into a motor truck and vice versa.

As a driver's seat is needed in either a pleasure or business vehicle the front seat remains unchanged.

When this vehicle is to be used as a pleasure car having a rear as well as a driver's seat, the mechanism herein described is operated to raise the rear seat into position for use; and when this vehicle is to be used as a truck this mechanism is operated in a reverse direction, whereby the rear seat is lowered to a level below the floor level of the vehicle, and boards are laid above the seat as thus lowered, thereby making a level floor for business purposes.

For convenience of access to the said boards and to the place where they are laid, as well as for convenience of loading the truck part of the vehicle, rear entrance doors are provided.

In the accompanying drawings forming part of this specification, in which like numbers of reference denote like parts wherever they occur, Figure 1 is a longitudinal sectional elevation, cut through the center of the motor vehicle, illustrating this invention with the seat in raised position;

Fig. 2 is a similar section, with the seat in lowered position;

Fig. 3 is a section taken on the line 3—3 in Fig. 1 as indicated by the arrows;

Fig. 4 is a perspective view of the seat-raising and lowering operating lever; and Fig. 5 is a rear view of a motor vehicle illustrating the position of the rear doors.

The body 1 of the vehicle is supported by the frame 2 in the usual manner.

Dependent from the frame 2 is a housing 3 forming a well, in which is recessed, when in lowered position, the seat 4 having the back 5. The said housing 3 is attached to the chassis 2 by screws or bolts 6 or other suitable means.

A pair of doors 7 close and open in the back of the body 1, and are hinged at 8 to the said body. They are kept closed by the lock handle 9.

The housing 3 is so located and arranged as to hang free of rear axle 10, which axle is provided with the customary differential 11 and wheels 12. A door 13 on each side of the body 1 allows entrance to the rear seat. The front part of the vehicle is not shown in the drawings.

An operating lever or handle 14 (see Fig. 4) has a socket 15 in one end, which socket is adapted to fit over an arm 16 when it is desired to operate the mechanism in either direction. The said arm 16 and lever 14 work together as a single member or lever to rotate spur gear 17 backward or forward. By the enmeshment of gear 18 with gear 17 the said gear 18 is caused to rotate in the direction opposite to the rotation of gear 17 and thus to actuate arm 19, which is pivoted at 20 to rod 21, which at its opposite end is pivoted at 22 to the lever 23. It will be understood that arm 16 is so fixed to or in connection with gear 17 as to cause its movement, and that gear 18 is so similarly attached to or connected with arm 19 as to cause its movement. Angle-irons 24 and 25 are attached to and depend from the frame 2, and are connected by angle-irons 26, 26ª, and 26ᵇ, to form a frame to receive the seat operating means, the shaft 27 being rotatively mounted in bearings in the angle-irons 26. Fixed on the shaft 27 is the lever 23, to which is attached the rod 21 as hereinbefore described.

Fig. 1 well shows the position of the levers 23 and 36 when the seat 4 has been elevated, while Fig. 2 shows the position of the said levers 23 and 36 when the seat has been lowered into the well within housing 3. It will be observed that housing 3 incloses the rigid or stable frame composed of the angle or similar members 24, 25, 26, 26ª, and 26ᵇ.

When elevated the seat 4 is supported by four legs, each of which is composed of a pair of foldable straps or parts 28 and 29.

In a fork 30 at each side of the seat 4 is mounted a grooved roller 31, which is adapted to run on a cylindrical bar 32 and 32ª as a track, each of the said bars 32 being strongly attached to and supported from a member 26ª by bolts 33 or the like.

An actuating cross member 34 is pivoted to the shaft 35 and to the outer end of the levers 36. To the extremities of member 34 there is pivoted at 37 a pair of arms 38, respectively, which again are pivoted at 39 to members 29.

When the seat is in the raised position shown in Fig. 1 the proper movement of lever 14 and arm 16 will cause arm 19 to push upon rod 21 and thus upon one arm of bell-crank 23, which depresses the arm 36 of the said bell-crank, thereby pulling cross member 34, which causes arms 38 to bend to the position shown in Fig. 2 and pulling with them members 29. This causes a break at the knuckle joint 40 between the members 29 and 28, whereby the seat 4 is pulled to the position shown in Fig. 2 and the members 28 and 29 are collapsed as there shown. The back 5 can then be bent over, as shown in Fig. 2, and the floor boards 41 put in place to cover the seat and provide a complete truck floor.

When it is desired to elevate the seat 4 to the position shown in Fig. 1 the lever 14 and arm 16 are moved in the opposite direction to that above mentioned, and thereby a pull on rod 21 is caused which, as will be readily understood, causes the lever 36 and the lever 23 to be tilted upwardly through the shaft 27, which forces the arms 38 to straighten toward the position shown in Fig. 1, which movement in turn raises the members 29 to a vertical position and thereby causes members 28 to assume a vertical position, all of which raises seat 4 from the position shown in Fig. 2 to that depicted in Fig. 1. The back of seat 4 can then be raised as shown in Fig. 1. Of course the floorboards 41 will be removed before the attempt is made to raise seat 4.

It is to be understood that the seat-supporting and raising members in part are duplicated on opposite sides of the car and cross-connected by shafts 27 and 35.

When the seat is being moved, either up or down, its movement is much facilitated by the rollers 31, on rods 32, this movement being particularly easy because the rollers are grooved and their respective tracks round.

Rods 32 and 32ᵃ are pivoted at 32ᵇ and are folded over as shown in Fig. 2.

The bearings 46 for shafts 42 and 44 are located on both sides of the chassis 2 and secured by bolts or screws 43. Members 29 are pivoted at 47 to member 26.

The pair of levers 23 and 36 are cross-connected by shaft 27, to which they are respectively fixed. Shaft 27 is so secured in connection with members 26 and 26ᵃ as to be quite stable. The pair of arms 19 are mounted fixedly on shaft 44.

A dog 48 is mounted on chassis 2 (as best seen in Figs. 1 and 2) in such manner as to prevent back rotation of gear 17. The said dog is pivoted at 49 to the chassis 2 and must be lifted out of engagement with gear 17 before gear 17 can be so operated as to lower seat 4. So long as the said dog engages gear 17 there can be no dropping of seat 4.

In practical use it has been found that the above described mechanism acts positively, invariably, and satisfactorily, either to raise or to lower the seat 4.

Because levers 23 and 36 are fixed to the same shaft they combined compose bell-cranks and in operative effect are the same as a bell-crank.

Having thus described this invention, we hereby reserve the benefit of all changes in form, arrangement, order, or use of parts, as it is evident that many minor changes may be made therein without departing from the spirit of this invention or the scope of the following claims.

We claim:

1. The combination of a motor vehicle chassis, a dependent housing attached thereto to form a well, a seat adapted to be ensconced in the well and to be supported thereabove, a plurality of pivoted sectional foldable supporting members, pivoted sectional links connecting certain adjacent sections of the foldable supporting members, a cross shaft connecting certain of the links, a pair of bell-crank levers pivoted in the housing and to the cross shaft to fold or to distend the supporting members, and operating connections pivoted to the bell crank levers to raise or lower the seat.

2. The combination of a motor vehicle chassis, a housing attached thereto, a seat adapted to be ensconced in a well formed by the said housing and to be supported thereabove, a plurality of foldable supporting members, a pair of bell-crank levers adapted to fold or to distend the said supporting members, means intermediate the said supporting members and the said bell-crank levers for actuating the former from the latter, means located on both sides of the vehicle and connected by a shaft and adapted to push or to pull upon the said bell-cranks, and a gear-actuated rod for actuating the said last-mentioned means.

3. The combination of a motor vehicle chassis, a housing attached thereto, a seat adapted to be ensconced in a well formed by the said housing and to be supported thereabove, a plurality of foldable supporting members, a pair of bell-crank levers adapted to fold or to distend the said supporting members, means intermediate the said supporting members and the said bell-crank levers for actuating the former from the latter, means located on both sides of the vehicle and connected by a shaft and adapted to push or to pull upon the said bell-cranks, and a pair of gears adapted to actuate the said last mentioned means.

4. The combination of a motor vehicle chassis, a housing attached thereto, a seat adapted to be ensconced in a well formed by the said housing and to be supported thereabove, a plurality of foldable supporting members, a pair of bell-crank levers adapted to fold or to distend the said supporting members, means intermediate the said supporting members and the said bell-crank levers for actuating the former from the latter, means located on both sides of the vehicle and connected by a shaft and adapted to push or to pull upon the said bell-cranks, and gear means adapted to actuate the said last mentioned means in either direction.

5. The combination of a motor vehicle chassis, a housing attached thereto, a seat adapted to be ensconced in a well formed by the said housing and to be supported thereabove, a plurality of foldable supporting members, a pair of bell-crank levers adapted to fold or to distend the said supporting members, means intermediate the said supporting members and the said bell-crank levers for actuating the former from the latter, means located on both sides of the vehicle and connected by a shaft and adapted to push or to pull upon the said bell-cranks, gear means adapted to actuate the said last mentioned means in either direction, and a dog for engagement with the said gear means so as to prevent involuntary lowering of the seat.

6. A convertible motor vehicle having a frame dependent from its chassis, a shaft mounted in the frame, a pair of bell-cranks mounted on the frame, a seat, a plurality of foldable supports pivoted to the seat and the frame, operating means pivoted to the shaft, the said foldable supports adapted either to push or to pull upon the said shaft to raise or lower the seat, and means for actuating the said bell-cranks in either direction.

7. A convertible motor vehicle having a frame dependent from its chassis, a shaft mounted in the frame, a pair of bell-crank levers on the shaft, a seat, a plurality of foldable supports for the said seat, means intermediate the foldable supports and the bell-crank levers adapted either to push or to pull upon the said supports, means for actuating the said bell-crank levers in either direction, the means intermediate the foldable seat supports and the bell-crank levers consisting of an intermediate member mounted on the shaft and a pair of levers pivoted to the opposite ends of the intermediate member and the supports, and operating means extending from the bell crank levers.

8. In a mechanism of the character described, a vertically movable seat, a frame dependent from each side of the vehicle, a vertical rounded bar supported by each of the said frames, a grooved roller at each end of the seat and adapted to ride upon the said bar, a plurality of foldable supports pivoted at the front and rear of the seat and to the frames, and a system of levers connected to the foldable supports including a pair of bell cranks, whereby to raise and lower the seat.

9. A convertible motor vehicle having a frame dependent from its chassis, foldable supports pivoted to the frame, a seat pivoted to the upper ends of the foldable supports, foldable braces extending from the frame each side the seat, rollers on each side the seat to engage the foldable braces to steady said seat in its movement, and means for extending and folding the foldable supports to raise or lower the seat.

In testimony whereof we hereunto affix our signatures.

GEORGE TOETTCHER.
CHARLES O. WINKLER.